United States Patent [19]

Jevnikar et al.

[11] Patent Number: 4,500,505

[45] Date of Patent: Feb. 19, 1985

[54] PROCESS FOR THE PRODUCTION OF HYDROGEN AND CARBONYL SULFIDE FROM HYDROGEN SULFIDE AND CARBON MONOXIDE USING A MULTI-METAL OXIDE/SULFIDE CATALYST

[75] Inventors: Mary G. Jevnikar, Cleveland; Philip L. Kuch, Aurora, both of Ohio

[73] Assignee: The Standard Oil Company, Cleveland, Ohio

[21] Appl. No.: 448,578

[22] Filed: Dec. 10, 1982

[51] Int. Cl.³ .......................... C01B 31/26; C01B 1/03
[52] U.S. Cl. ................................. 423/416; 423/648 R
[58] Field of Search ................ 423/415 R, 416, 648 R

[56] References Cited

U.S. PATENT DOCUMENTS 3,856,925 12/1974 Kodera et al. ...................... 423/416

OTHER PUBLICATIONS

FuBuda et al., "Catalytic Activity at Metal Sulfides for the Reaction, $H_2S+CO=H_2+COS$", Journal of Catalysis, vol. 49, pp. 379–382, 1977.

Primary Examiner—Earl C. Thomas
Attorney, Agent, or Firm—Teresan W. Gilbert; Joseph G. Curatolo; Larry W. Evans

[57] ABSTRACT

Hydrogen and carbonyl sulfide are produced by a process comprising contacting gaseous hydrogen sulfide with gaseous carbon monoxide in the presence of a catalytic composition containing an oxide and/or sulfide of at least one of molybdenum, tungsten, iron, chromium and vanadium in combination with at least one promoter metal, e.g. a catalyst of the formula $Cs\ Cu_{0.2}Zn_{0.5}Mn_{0.5}Sn_{2.4}Mo\ O_xS_y$.

23 Claims, No Drawings

PROCESS FOR THE PRODUCTION OF HYDROGEN AND CARBONYL SULFIDE FROM HYDROGEN SULFIDE AND CARBON MONOXIDE USING A MULTI-METAL OXIDE/SULFIDE CATALYST

BACKGROUND OF THE INVENTION

1. Field of the Invention

This invention relates to the production of hydrogen. In one aspect, the invention relates to the production of hydrogen from the reaction of hydrogen sulfide and carbon monoxide while in another aspect, the invention relates to conducting this reaction in the presence of various multi-metal oxides and/or sulfides.

2. Description of the Prior Art

Hydrogen is a valuable resource as both a fuel source and chemical feedstock and as such, its production has received much attention from the chemical industry. Presently, the dominant industrial method of production is the reaction of steam with natural gas (steam reforming) although various other methods are known. Of these other methods, one that is of particular interest is the oxidation of hydrogen sulfide with carbon monoxide to produce hydrogen and carbonyl sulfide.

This reaction is of particular interest for several reasons, one of which is that hydrogen sulfide is a relatively inexpensive material and is available in large quantities from the desulfurization of fossil fuels and sour natural gas deposits. Presently this material is considered more of a waste problem than a feedstock and is typically oxidized by the Claus process to water and elemental sulfur.

Another reason for the interest in this reaction is that it can be combined with other reactions to form various thermochemical cycles, such as

| | |
|---|---|
| $H_2S + CO \rightleftharpoons H_2 + COS$ | (a) |
| $COS + O_2 \rightarrow CO + SO_2$ | (b) |
| $H_2S + O_2 \rightarrow H_2 + SO_2$ | (c) |

The second step which enables the recycle of relatively expensive carbon monoxide makes this thermochemical cycle economically attractive. In effect, hydrogen sulfide is combusted to hydrogen and sulfur dioxide, the latter being a useful resource in the manufacture of sulfuric acid.

While the reaction of hydrogen sulfide and carbon monoxide to produce hydrogen and carbonyl sulfide is known, few catalysts have been identified as useful for promoting it. Fukuda et al. describe in several publications the use of various metal sulfides, e.g. titanium disulfide, zinc sulfide, copper sulfide, nickel sulfide, etc. See U.S. Pat. No. 3,856,925; *Journal of Catalysis,* 49, 379 (1977); and *Bulletin of Chemistry for Japan,* 51, 150 (1978). However, since these disclosures describe relatively few catalysts, there is a continuing interest in identifying new catalysts for this reaction.

SUMMARY OF THE INVENTION

According to this invention, hydrogen and carbonyl sulfide are produced by a process comprising contacting gaseous hydrogen sulfide with gaseous carbon monoxide in the presence of a catalytic amount of a composition of the formula:

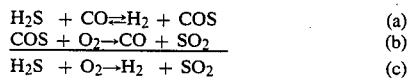  (I)

where

M is at least one of Mo, W, Fe, Cr and V;

M' is at least one of Li, Na, K, Rb, Cs, Cu, Co, Ni and Al when b is greater than 0;

M'' is at least one of Sn, Mn, Pb, Ge, Si, Mg, Ca, Sr, Ba, Zn, Ti, Hf and Zr when c is greater than 0;

a is a number of about 0.1–2;

b is a number of 0 to about 3;

c is a number of 0 to about 10; and the sum of $x+y$ is a number that satisfies the valence requirements of the other elements present;

with the proviso that at least one of b and c is greater than zero.

Use of these catalysts render the reaction highly efficient in terms of both conversion of reactants and selectivity to desired products.

DETAILED DESCRIPTION OF THE INVENTION

Catalyst

As is evident from formula I, the catalytic composition of this invention is at least a 3 element material, i.e. a material containing at least one metal element M, at least one of oxygen and sulfur, and at least one of a metal M' and M'', all in designated, proportional amounts. Preferably, M is at least one of Mo and W, M' is at least one of Cs, Ni and Cu and M'' is at least one of manganese and tin (where M' and M'' are present).

Preferably, a is a number of about 0.5 to about 1.5, b (when greater than zero) is a number of about 0.5 to about 1.5 and c (when greater than zero) is a number of about 1 to about 6.

As taught by formula I, certain of the components can be combinations of two or more elements, e.g. M'' can be a combination of manganese and tin. In such instances, the subscript value represents the sum of the elements (e.g. for M'', the value of c is the sum of the subscripts for manganese and tin which is a number less than or equal to about 10).

Partcularly preferred catalytic compositions are those where both M' and M'' are present and where M'' represents more than one element. Use of this particular group of catalysts in the hydrogen sulfide/carbon monoxide reaction greatly promotes the formation of hydrogen.

The exact structure or element arrangement of these catalysts is not known but the components are present in the form of their oxides and/or sulfides. However, the compositions of formula I are known not to be a mere physical mixture of their components but rather unique compositions where the individual components are chemically and/or physically bonded to one another.

These catalysts may be used either in the 100% active form or in a diluted form and can be either supported or unsupported. If supported, suitable support materials include alumina and/or silica, titania, zirconia, silicon carbide, boron, various phosphates, etc., with the high surface area (>about 50 m²/g) gamma-/or silica-alumina preferred. If a support is used, the catalytic composition (that of formula I) is generally present in an amount of at least 1 weight percent, based on the combined weight of the support and the catalytic composition. If the catalytic composition is impregnated into the support, then the composition is preferably present in an amount of at least about 5 weight percent. If the catalytic composition is coated onto the support, then the composition is preferably present in an amount of at least about 20 weight percent.

The catalytic compositions of formula I can be prepared by any one of a number of different methods, the particular method employed being a matter of convenience. A typical method of preparation involves the mixing of the appropriate metal components in the proper proportions in an aqueous mixture, removing the liquid media with or without a reducing agent, and calcining the solid product. The metal components can be added in any order during the preparation procedure but certain orders may be preferred to others depending upon the composition of the final catalyst. The metal components can be added as a nitrate, carbonate, halide, acetate, etc., as long as the anion to the metal is removable with calcination. Combinations of different metal sources, e.g. a halide and a carbonate, can also be used. If a support is used, the material comprising the support can be incorporated into the catalyst along with the other ingredients or the catalyst composition may be coated and/or impregnated onto or into a support core. If the catalyst composition is to be coated onto a support, preferably the metal components of the catalyst are added as their oxides. After the catalyst components have been combined to form an aqueous mixture, the mixture is then taken to dryness and the dry solid obtained is calcined, typically in the presence of air. Other methods of preparation are known in the art and include such techniques as the use of nonaqueous or mixtures of nonaqueous and aqueous solvent or slurry media; pH adjustment of the catalyst precursor solution or slurry; multiple impregnations, coatings, and/or calcination steps, etc.

After the catalyst has been calcined, typically at a temperature between about 300° and about 600° C., the catalyst composition is preferably sulfided. This can be accomplished at a temperature between about 100°–800° C., preferably between about 300° and about 500° C., and at a pressure between about 0 and about 150 atmospheres, preferably between about 0 and about 50 atmospheres. The sulfiding can last from less than one hour to more than 24 hours with a typical sulfiding time about 1 to about 6 hours. Hydrogen sulfide is a preferred sulfiding agent but others, such as the various mercaptans (e.g. methyl mercaptan, ethyl mercaptan, etc.), can be used. The sulfiding can be done either neat or diluted, e.g. with such diluents as carbon monoxide, nitrogen, helium, etc., and it can be done before, after or during an optional reduction step with hydrogen. If done with a reduction step, the hydrogen sulfide:hydrogen mole ratio can vary widely, typically between 50:1 to 1:50.

The catalyst compositions can also be sulfided in situ with the feed and/or product stream of the process. This stream can produce a catalyst having a mixed oxide/sulfide content, the exact amount of each difficult to determine and subject to change over the course of the reaction until equilibrium is reached.

Reaction

As stated earlier, the reaction of carbon monoxide with hydrogen sulfide to form carbonyl sulfide and hydrogen is a known vapor phase reaction and is described in such references as U.S. Pat. No. 3,856,925 and Fukuda et al., *Journal of Catalysis,* 49, 379 (1977). The reaction is typically conducted within a temperature range of 50°–800° C., preferably 200°–400° C., and within a pressure range of 0–1,000 psig, preferably 0–500 psig. Stoichiometric amounts of reactants are required although preferably an excess of hydrogen sulfide is present as a means of shifting the equilibrium to the right. The reaction can be conducted in any vapor phase reactor including the various fixed- and fluid-bed configurations and the contact time of the reactants over the catalyst bed will vary with the other process parameters. Typically a contact time of about 1 to about 20 seconds, preferably 2 to about 10 seconds is employed in a fixed-bed reactor.

The products of this process are hydrogen, carbonyl sulfide and minor amounts of other compounds, primarily methane and carbon dioxide. Hydrogen and carbonyl sulfide are the desired products, the former to be ultimately recovered and the latter a useful intermediate in various thermochemical cycles in which this reaction is but one step.

The following examples are illustrative embodiments of this invention. Unless indicated to the contrary, all parts and percentages are by weight.

SPECIFIC EMBODIMENTS

Catalyst Preparation

The following procedure was used to prepare the catalyst of the first example in the Table and is illustrative of the procedure used to prepare all the catalysts reported in the Table.

A high surface area gamma-alumina extrudate (30 g, surface area of about 200 m$^2$/g, pellet form) was treated at 600° C. under nitrogen for several hours. The alumina was commercially obtained from Strem Chemicals. A mixture of copper nitrate, Cu(NO$_3$)$_2$.3H$_2$O (0.5 g); zinc nitrate, Zn(NO$_3$)$_2$.6H$_2$O (1.5 g); ammonium heptamolybdate, (NH$_4$)$_6$Mo$_7$O$_{27}$.4H$_2$O (1.81 g); and distilled water (13 cc) was then poured over the pellets and stirred well until all the liquid was absorbed. The pellets were then dried for approximately 4 hours at 125° C. A 25 cc solution of cesium nitrate. Cs(NO$_3$)(2.0 g), was then divided into two equal parts and the first part poured over the dried pellets and stirred well until all the liquid was absorbed. The pellets were then dried overnight at 125° C. in an oven. The next day this procedure was repeated with the remaining 13 cc of the cesium nitrate solution except that the pellets were then dried for only about 4 hours at 125° C. Subsequently, a solution of 1 g of manganese chloride, MnCl$_2$.4H$_2$O, dissolved in water (13 cc) was poured over the dried pellets and stirred well until all the liquid was absorbed. The wet pellets were again dried overnight at 125° C. Finally, a solution of stannous chloride, SnCl$_2$.2H$_2$O (5.64 g), dissolved in acetone (18 cc) was poured over the dried pellets, stirred well until liquid was absorbed and then the pellets were dried for about 2 hours at 125° C.

Approximately 20 cc of the resulting catalyst precursor (gamma-alumina pellets impregnated with the various metal components) was then placed in a quartz tube (0.5" internal diameter, catalyst bed about 4" long) and held in place with quartz wool plugs. The precursor was then treated for about 15 minutes at room temperature with nitrogen, subsequently for about one hour at 400° C. with nitrogen and finally for about one hour at 400° C. with hydrogen sulfide. The resulting catalyst can be represented by the empirical formula $$CsCu_{0.2}Zn_{0.5}Mn_{0.5}Sn_{2.4}MoO_xS_y \qquad (II)$$

Procedure and Conditions

Unless otherwise noted, the reactions were conducted in the quartz tube used to condition and sulfide the catalyst precursor as described in the preceding paragraph. Following this pretreatment, a feed of hydrogen sulfide:carbon monoxide was introduced into the tube at a 1:1 molar ratio and at a flow rate that established a 10 second contact time of reactants over the catalyst bed. The off-gas rate was measured with a soap-film meter and the off-gas composition was determined after one hour of on-stream activity with the aid of a Carle 111 gas chromotograph equipped with a 158-b column system. Reject gases were scrubbed in a monoethanolamine/water solution and then vented to the hood. The reaction temperature of each example was approximately 400° C. and the tube was heated by means of a Lindberg tube furnace. The reactant gases were introduced into the tube from tanks through stainless steel tubing, regulators, flow controllers, and rotometers. The gases were purchased from the Matheson Gas Company and used without further purification.

The percent conversion as reported in the Table was calculated by subtracting the amount of hydrogen sulfide leaving the reactor from the amount of hydrogen sulfide fed to the reactor and dividing the difference by the amount of hydrogen sulfide fed to the reactor and then multiplying the quotient by 100. The ratios of hydrogen to methane and hydrogen to carbon dioxide were calculated by simply dividing the hydrogen recovered (in mole percent) by either the methane or carbon dioxide recovered (also in mole percent) and reporting the quotient. The higher the quotient, the better the selectivity. Although not reported in the Table, for each mole of hydrogen produced, one mole of carbonyl sulfide was also produced.

TABLE

| Example | Catalyst | H$_2$S Conversion (%) | H$_2$/CH$_4$ | H$_2$/CO$_2$ |
|---|---|---|---|---|
| \multicolumn{5}{c}{REACTION OF HYDROGEN SULFIDE AND CARBON MONOXIDE IN THE PRESENCE OF VARIOUS METAL OXIDES/SULFIDE CATALYSTS} | | | | |
| A | Alundum spheres | 0 | 0 | 0 |
| B* | γ-alumina | 11.3 | 6.2 | 6.4 |
| 1 | Cs$_1$Cu$_{.2}$Zn$_{.5}$Mn$_{.5}$Sn$_{2.4}$MoO$_x$S$_y$ | 23.8 | 30 | 4 |
| 2 | Cs$_1$Cu$_{.2}$Zn$_{.5}$Mn$_{.5}$WO$_x$S$_y$ | 23.3 | 24.4 | 3.7 |
| 3 | Cs$_1$Cu$_{.2}$Zn$_{.5}$WO$_x$S$_y$ | 22.8 | 35.7 | 3.9 |
| 4 | Cs$_1$Cu$_{.2}$Zn$_{.5}$MoO$_x$S$_y$ | 24 | 2.5 | 1.1 |
| 5 | Cs$_1$Co$_{.25}$MoO$_x$S$_y$ | 24.64 | 1.30 | 0.65 |
| 6 | Cs$_1$Co$_{.25}$Mn$_{.9}$MoO$_x$S$_y$ | 23.98 | 2.56 | 1.21 |
| 7 | Cs$_1$Cu$_{.2}$Zn$_{.5}$MoO$_x$S$_y$ | 24.08 | 2.53 | 1.13 |
| 8 | Cs$_1$Cu$_{.2}$Zn$_{.5}$Mn$_{1.1}$MoO$_x$S$_y$ | 22.49 | 7.30 | 2.17 |
| 9 | Cs$_1$Cu$_{.2}$Zn$_{.5}$Mn$_{2.7}$MoO$_x$S$_y$ | 24.89 | 7.60 | 2.23 |
| \multicolumn{5}{c}{REACTION OF HYDROGEN SULFIDE AND CARBON MONOXIDE CATALYZED BY VARIOUS METAL OXIDES/SULFIDES} | | | | |
| 10** | Cs$_1$Cu$_{.2}$Zn$_{.5}$Mn$_{5.4}$MoO$_x$S$_y$ | 23.69 | 12.39 | 2.46 |
| 11*** | Cs$_1$Cu$_{.2}$Zn$_{.5}$Mn$_{5.3}$MoO$_x$S$_y$ | 22.17 | 5.5 | 1.71 |
| 12 | Cs$_1$Cu$_{.2}$Zn$_{.5}$Sn$_{2.4}$MoO$_x$S$_y$ | 22.51 | 20.48 | 2.64 |
| 13 | Cs$_1$Cu$_{.2}$Zn$_{.5}$Mn$_{.5}$MoO$_x$S$_y$ | 20.49 | 4.96 | 1.40 |
| 15 | Cs$_1$Cu$_{.2}$Zn$_{.5}$Ba$_{2.1}$WO$_x$S$_y$ | 23.62 | 41.5 | 3.54 |
| 16# | Pb$_1$Fe$_2$O$_x$S$_y$ | 25.2 | ## | 8.56 |

*Reaction temperature 600° C.
**Mn source during catalyst preparation was MnCl$_2$.4H$_2$O.
***Mn source during catalyst preparation was Mn(NO$_3$)$_3$.6H$_2$O.
Reaction temperature 600° C.; coated on silica-alumina spheres.
Not measured.

As a comparison of the data reported in the above Table shows, the catalysts of this invention are useful for promoting the efficiency of the reaction. Control Examples A and B illustrate poor, if any, conversion activity and generally low hydrogen selectivity. Comparison of Examples 10 and 11 illustrate a favorable effect on the hydrogen selectivity from preparing catalysts from the various metal halides (here a chloride) rather than the various metal nitrates. Examples 8A–10 demonstrate the increase in selectivity of hydrogen over methane by the use of increasing amounts of a metal M'' (here Mn).

Although the preceding examples describe this invention in considerable detail, this detail is for the purpose of illustration only and is not to be construed as a limitation upon the invention as described in the specification or following claims.

What is claimed is:

1. A process for the production of hydrogen and carbonyl sulfide, the process comprising contacting gaseous hydrogen sulfide with gaseous carbon monoxide in the presence of a catalytic amount of a composition of the formula:

$$M_aO_xS_yM'_bM''_c \quad (I)$$

where
M is at least one of Mo, W, Fe, Cr and V;
M' is at least one of Li, Na, K, Rb, Cs, Cu, Co, and Al when b is greater than 0;
M'' is at least one of Sn, Mn, Pb, Ge, Si, Mg, Ca, Sr, Ba, Zn, Ti, Hf and Zr when c is greater than 0;
a is a number of about 0.1–2;
b is a number of 0 to about 3;
c is a number of 0 to about 10; and
the sum of x+y is a number that satisfies the valence requirements of the other elements present;
with the proviso that at least one of b and c is greater than zero.

2. The process of claim 1 where M is at least one of molybdenum and tungsten.

3. The process of claim 1 where M', when b is greater than zero, is at least one of cesium and copper.

4. The process of claim 2 where M', when b is greater than zero, is at least one of cesium and copper.

5. The process of claim 1 where M'', when c is greater than zero, is at least one of manganese and tin.

6. The process of claim 2 where M'', when c is greater than zero, is at least one of manganese and tin.

7. The process of claim 3 where M'', when c is greater than zero, is at least one of manganese and tin.

8. The process of claim 1 where the value of a is about 0.5–1.5, of b, when present, about 0.5–1.5, and of c, when present, about 1–6.

9. The process of claim 4 where the value of a is about 0.5–1.5, of b, when present, about 0.5–1.5, and of c, when present, about 1–6.

10. The process of claim 7 where the value of a is about 0.5–1.5, of b, when present, about 0.5–1.5, and of c, when present, about 1–6.

11. The process of claim 1 where the composition of formula I is used in combination with a support.

12. The process of claim 8 where the composition of formula I is used in combination with a support.

13. The process of claim 10 where the composition of formula I is used in combination with a support.

14. The process of claim 11 where the support is an alumina or a silica-alumina.

15. The process of claim 13 where the support is an alumina or a silica-alumina.

16. The process of claim 15 where the composition of formula I is coated onto the support and is present in an amount of at least about 20 weight percent, based on the combined weight of the support and composition.

17. The process of claim 1 where the hydrogen sulfide and carbon monoxide are contacted at a temperature between about 300°–600° C. and at a pressure between about 0–50 atmospheres.

18. The process of claim 8 where the hydrogen sulfide and carbon monoxide are contacted at a temperature between about 300°–600° C. and at a pressure between about 0–50 atmospheres.

19. The process of claim 13 where the hydrogen sulfide and carbon monoxide are contacted at a temperature between about 300°–600° C. and at a apressure between about 0–50 atmospheres.

20. The process of claim 1 where M'' is added during the catalyst preparation as a metal halide.

21. The process of claim 1 where M'' is added during the catalyst preparation as a metal chloride.

22. The process of claim 21 where M'' is manganese.

23. A process for the production of hydrogen and carbonyl sulfide, the process comprising contacting gaseous hydrogen sulfide with gaseous carbon monoxide in the presence of a catalytic amount of a composition of the formula:

$$M_a O_x S_y M'_b M''_c$$

wherein
M is at least one of Mo, W, Fe, Cr and V;
M' is at least one of Li, Na, K, Rb, Cs, Cu, Co, Ni and Al when b is greater than 0;
M'' is at least one of Sn, Mn, Pb, Ge, Si, Mg, Ca, Sr, Ba, Zn, Ti, Hf and Zr when c is greater than 0; and wherein
a is a number of about 0.1–2;
$0 < b \leq 3$;
$0 < c \leq 10$; and
the sum of x+y is a number that satisfies the valence requirements of the other elements present.

* * * * *